UNITED STATES PATENT OFFICE.

DAVID PARKER, OF SHAKER VILLAGE, NEW HAMPSHIRE.

IMPROVED METHOD OF PRESERVING AND DRYING GREEN CORN ON THE COB.

Specification forming part of Letters Patent No. 53,861, dated April 10, 1866.

*To all whom it may concern:*

Be it known that I, DAVID PARKER, of Shaker Village, in the county of Merrimack and State of New Hampshire, have invented or discovered a new and useful Process in the Manner of Drying and Preparing Green or Unripe Corn on the Cob for Table Use; and I do hereby declare that the following is a full, clear, and exact description of the same, and of the difference between my process and those hitherto practiced or known.

As a general thing green or unripe corn is put up in hermetically-sealed jars or cans. The grains have, however, been cut from the cob and put into an oven and dried, and afterward used for the table. Another plan suggested and patented was to bore out the pith of the cob and place some salt or sugar in the bored-out portion, and then dry the corn on the cob. These several plans have been tried, and, though answering a tolerably good purpose, are troublesome and expensive. I propose to dry the green or unripe corn on the cob without the expense or trouble of boring through the cob longitudinally, without cutting off the grains, and without tight cans or jars.

My invention consists, simply, in first scalding the unripe corn on the ears—or "parboiling" it, as it is termed—and then removing the ears to a chamber or apartment, where there is kept up artificially a high degree of heat and circulation, and drying the partially-cooked corn as speedily as possible without damaging it by scorching.

To enable others skilled in the art to make and use my invention, I will proceed to describe the same as I have practiced it.

When the corn is in the condition that it is in when used upon the table, or in an unripe state, I gather it, and in suitable vessels boil or cook it for a short period—say until it is about half-cooked. I then remove it to a drying-room, where it is laid out upon racks or perforated floors or shelves, and subject it to a speedy drying operation by artificial heat circulated through it. When the moisture is driven off thoroughly the corn may be barreled or boxed up and sent to market or retained for use for any reasonable length of time.

To prepare such corn for the table it is only necessary to soak it in cold water over night, or for ten or twelve hours, and then boil it in the same water in which it was soaked some three or four minutes.

An indifferent quality of corn may be prepared by drying quickly without the parboiling; but the best must be partially cooked before it is subjected to the drying process, and dried as quickly thereafter as possible, not even allowing it to get cold, as it is so apt in the season in which it must be put up to mold or sour after it has been in boiling water and taken out and allowed to remain for any even short period without driving off by heat all the moisture in it.

Having thus fully described my invention, what I claim as new, and desire to secure by Letters Patent, is—

The drying and preserving of green or unripe corn on the cob by first scalding or partially cooking it, and then drying it rapidly by artificial heat in ovens or drying-chambers until all the moisture is driven off from the grains and cob, substantially as herein described.

DAVID PARKER.

Witnesses:
A. B. STOUGHTON,
EDM. F. BROWN.